United States Patent
Milliman

[11] Patent Number: 5,544,403
[45] Date of Patent: Aug. 13, 1996

[54] METHOD FOR REMOVING ELEMENTS FROM BORE OF CROSS-HEAD DIE BODY

[76] Inventor: James A. Milliman, P.O. Box 109, Camden, N.Y. 13316

[21] Appl. No.: 258,473

[22] Filed: Jun. 10, 1994

[51] Int. Cl.[6] .............................. B23P 19/00; B05C 3/02; A23G 1/22
[52] U.S. Cl. ...................... 29/426.5; 118/404; 118/405; 425/113; 425/114; 425/133.1; 425/192 R
[58] Field of Search .................................. 118/404, 405; 425/113, 114, 133.1, 192 R; 29/426.5

[56] References Cited

U.S. PATENT DOCUMENTS

| | | | |
|---|---|---|---|
| 3,947,173 | 3/1976 | Dougherty | 425/113 |
| 4,165,957 | 8/1979 | Kertscher | 425/113 |
| 5,108,683 | 4/1992 | Anand | 264/174 |
| 5,316,583 | 5/1994 | Milliman | 118/405 |
| 5,358,570 | 10/1994 | Drawbaugh | 118/404 |

Primary Examiner—Robert J. Warden
Assistant Examiner—Christopher Y. Kim
Attorney, Agent, or Firm—Charles S. McGuire

[57] ABSTRACT

A cross-head die for applying a coating layer to a filamentary member, e.g., plastic insulation to an electrical wire, includes a die body with an axial bore in which a tip holder is removably positioned with tapered surfaces of the holder in engagement with like-tapered surfaces of the bore. The holder is maintained in position by a lock nut on a threaded portion of the holder extending out of the die body. In order to assist in removal of the tip holder, an auxiliary nut, engageable with the threads on the tip holder, is provided. The threads on the collar and lock nut are right-hand, while those on the tip holder and auxiliary nut are left-hand, or vice versa. In order to remove the tip holder, the lock nut is backed off a few turns and the auxiliary nut is threaded on the tip holder until it engages the lock nut. As torque is applied to the auxiliary nut an axial force is exerted on the tip holder, pulling it free of the body bore and permitting its easy removal after both nuts are removed.

4 Claims, 4 Drawing Sheets

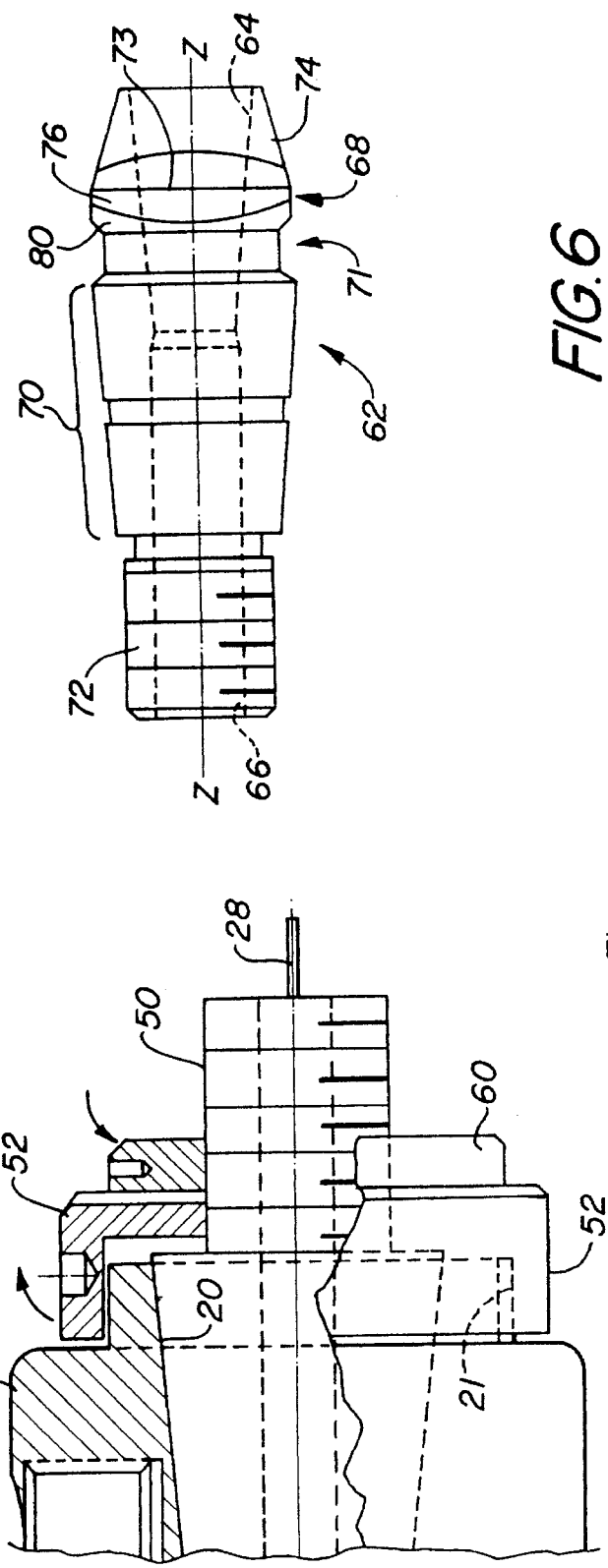
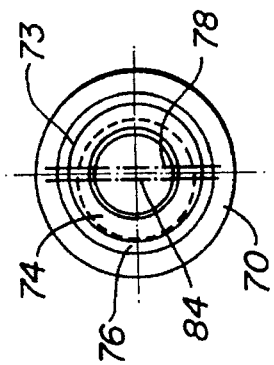
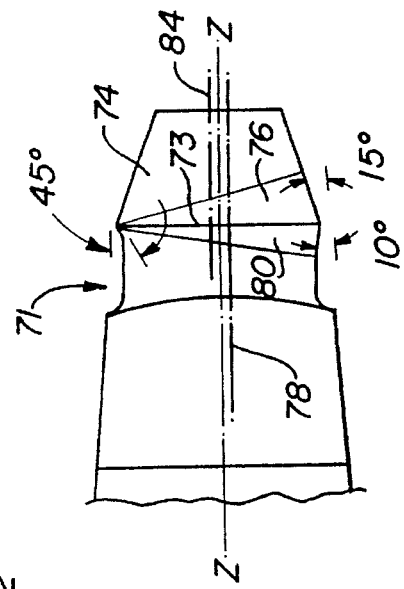
FIG. 3
FIG. 4
FIG. 5
FIG. 6

5,544,403

METHOD FOR REMOVING ELEMENTS FROM BORE OF CROSS-HEAD DIE BODY

BACKGROUND OF THE INVENTION

This invention relates to die apparatus of the so-called cross-head type wherein a layer of insulating material, or the like, is applied to a continuous filament such as an electrical wire, optical fiber, etc.

In typical cross-head dies a filamentary element is drawn axially through a die body as a coating material, such as molten plastic, is supplied to a cavity within the body through a radial opening therein. As the filament is drawn through a die orifice at the front of the body it is coated with the plastic, which dries to form a continuous insulating layer having a thickness dependent on the difference in diameters of the die orifice and the filament. Guide means within the die body provide axial alignment of the filament with the die orifice.

Applicant's U.S. Pat. No. 5,031,568 discloses cross-head die apparatus wherein internal elements are maintained in axially aligned relation by mating surfaces which are conically tapered about the central, longitudinal axis. Surfaces of an axial bore extending through the die body are tapered from a smaller diameter at their rearward ends, i.e., the end at which the filament enters, to a larger diameter at their front ends, i.e., in the direction of filament movement. This assembly of elements included a die member having an orifice at the forward end of the die body through which the coated filament exits the apparatus. When the elements are assembled, the exterior surface of the die member tapers from a smaller to a larger diameter from its front to its end, i.e., oppositely to the direction of taper of the internal bore of the body. The die member is positioned in a die holder having an internal surface of the same tapering configuration as the external surface of the die member, and an external surface tapering from larger to smaller diameters from front to rear, mating with the axial bore of the cross-head body. A threaded collar on the front of the body maintains the elements within the bore.

Other U.S. patents, such as U.S. Pat. No. 3,649,730 of Benteler et al, U.S. Pat. No. 3,947,173 of Dougherty, U.S. Pat. No. 4,165,957 of Kertacher and U.S. Pat. No. 5,108,683 of Anand, disclose cross-head extruding apparatus having elements with tapered external surfaces mating with tapered bores of other elements. A primary requirement of such apparatus is that the molten plastic be evenly distributed about the wire as it enters and passes through the die orifice. A number of arrangements, often requiring relatively complex and expensive elements and/or machining operations, have been proposed to achieve this requirement. It is also necessary to disassemble the components from time to time for purposes of cleaning, repair, etc. Since mating surfaces of the elements are often in tight engagement, with close tolerances, parts may tend to stick together and be difficult to disassemble.

The principal object of the present invention is to provide an assembly of cross-head die elements which retains the advantages of tapered mating surfaces to maintain axial alignment with improved means and method of disassembly of elements.

Other objects will in part be obvious and will in part appear hereinafter.

SUMMARY OF THE INVENTION

The assembly includes a body having a through, axial bore with an internal surface which tapers concentrically outwardly about the axis from the front toward the rear end of the body. In the disclosed embodiment, the bore tapers at a first angle from the front end of the body for a portion of its axial length, and at a second angle, larger than the first, for the remainder of its length. A die member has an external surface mating with the portion of the bore tapering outwardly from the front end at the first angler and an internal surface tapering inwardly from the rear to an orifice at the front through which the coated filament exits the apparatus. A tip holder, also referred to as a core tuber has an external surface including a rearward axial portion mating with the portion of the bore tapering at the second angle, and a forward axial portion in spaced relation to the body bore, providing a cavity therebetween. An externally threaded, cylindrical portion extends from the tip holder out the rear end of the body, and is surrounded by an externally threaded collar on the body.

The tip holder also has a through, axial bore, a forward portion of which tapers inwardly toward the rear where it joins with an axial portion of constant diameter, i.e., a cylindrical bore. A die tip, through which the filament is drawn to maintain its alignment with the orifice in the die member, has an exterior surface with a first axial portion which tapers outwardly from front to rear, and a second axial portion which tapers inwardly from front to rear. The second axial portion of the die tip mates with the forward portion of the tip holder bore, and the first axial portion of the die tip extends forwardly of the tip holder in spaced relation to the internal surface of the die member bore.

A continuous, annular cavity is thus formed between the first (forward) axial portion of the tip holder and the body axial bore, and between the first (forward) portion of the die tip and the internal surface of the die member. An annular groove is formed about the surface of the tip holder between the first and second axial portions thereof, and communicates with the aforementioned continuous cavity in a first embodiment via a plurality of axial grooves in the exterior surface of the tip holder.

In a second disclosed embodiment, no axial grooves are provided in the tip holder; instead, the annular lip extending around the tip holder at the forward end of the annular groove is of smaller diameter than the outwardly adjacent portion of the body bore. Molten plastic passes from the annular groove and over the annular lip of the tip holder into the cavity. Moreover, both the annular groove and lip are eccentric with respect to the central axis of the tip holder, and compound angles are provided on both the forward and rear sides of the lip, all cooperating to provide an evenly distributed flow of coating material about the cavity preparatory to being deposited on the wire.

A radial opening in the body communicates with the body axial bore at a position adjacent the tip holder annular groove. The filament coating material is injected through the radial bore, flows around the annular groove in the tip holder, into the cavity and out of the apparatus through the die member orifice where it forms a uniform coating on the filament. An annular lock nut is threaded to the previously mentioned collar on the rear of the body to retain the tip holder in assembled relation therewith. No lock nut or other retaining means is required at the front of the body for the die member due to the inward taper from rear to front of the mating surfaces of the die member and body axial bore. The externally threaded, cylindrical portion of the tip holder extends rearwardly from the body, being surrounded by the lock nut.

Although the configuration of the tip holder permits removal thereof out the rear end of the body when the lock nut is removed, the parts may sometimes bind or stick, making removal difficult. In order to assist in removal of the tip holder, an auxiliary nut, engageable with the threads on the tip holder, is provided. The threads on the collar and lock nut are right-hand, while those on the tip holder and auxiliary nut are left-hand, or vice versa. In order to remove the tip holder, the lock nut is backed off a few turns and the auxiliary nut is threaded on the tip holder until it engages the lock nut. As torque is applied to the auxiliary nut an axial force is exerted on the tip holder, pulling it free of the body bore and permitting its easy removal after both nuts are removed.

The foregoing features, as well as other details of construction, assembly and disassembly of the apparatus and components thereof will be more readily understood and fully appreciated from the following detailed description of the presently preferred embodiment, taken in conjunction with the accompanying drawings.

BRIEF DESCRIPTION OF THE DRAWINGS

FIG. 3 is a fragmentary, side elevational view of the rear portion of the apparatus of FIG. 1, also showing an additional element and the method of its use to assist in disassembly of the components;

FIG. 4 is a side elevational view of an alternate embodiment of one of the components;

FIG. 5 is a fragmentary, side elevational view of the forward end of the component of FIG. 4, rotated about its longitudinal axis 90° from the position of FIG. 4;

FIG. 6 is a front elevational view of the component of FIGS. 4 and 5;

DETAILED DESCRIPTION

Figure 1:
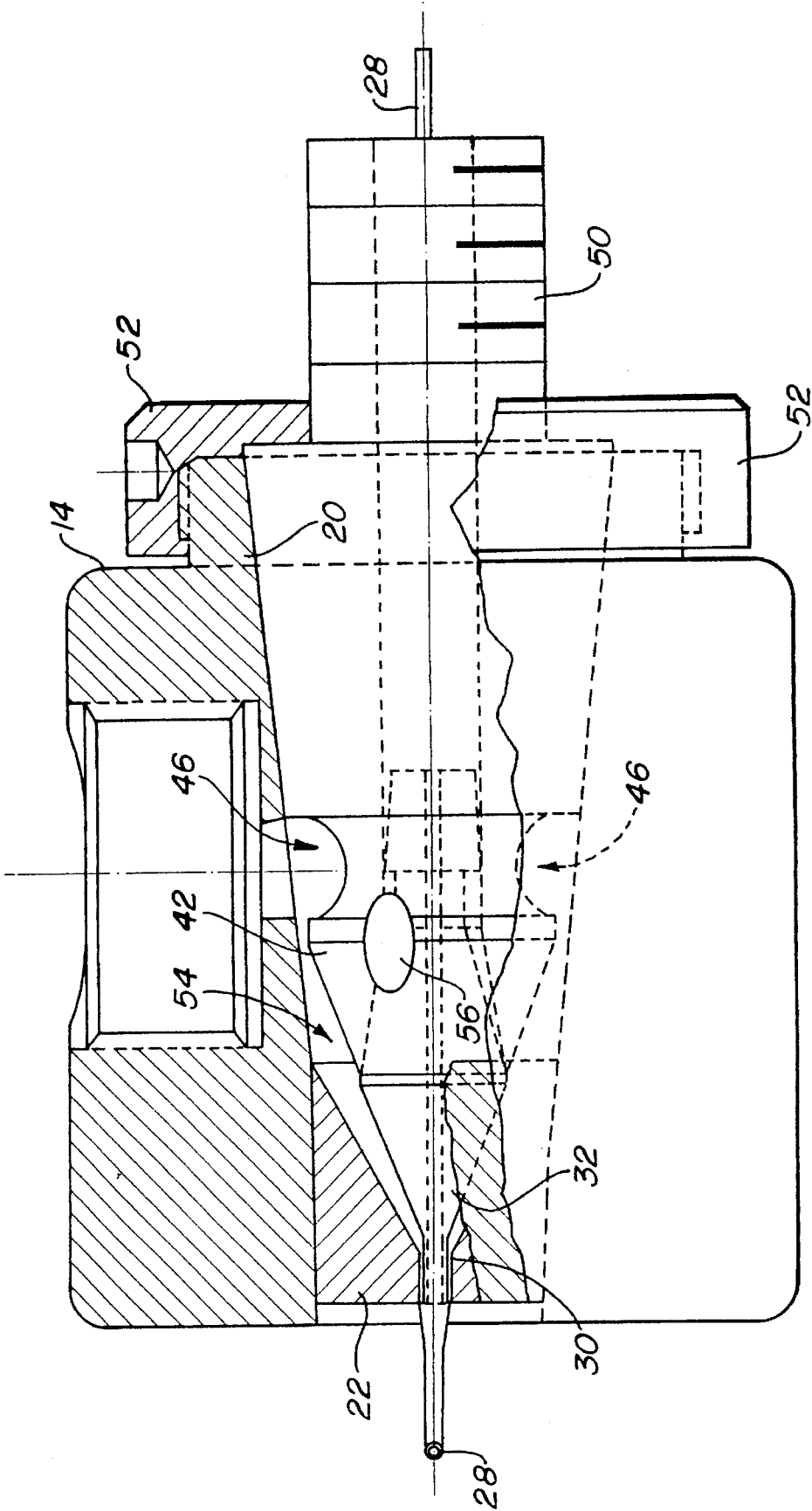
FIG. 1 is a side elevational view, partly in section, showing the components of the cross-head apparatus in assembled relation.

Referring now to the drawings, the apparatus of the invention includes a body 10 which may have a cylindrical or otherwise configured exterior, a through, axial bore concentric about axis X—X, and a radial bore extending through one side along axis Y—Y to communicate with the axial bore. For orientation purposes, the ends of body 10 indicated by reference numerals 12 and 14 are designated the front and rear, respectively, of body 10. The same front, or forward, and rear designations are applied to the other elements in their assembled relation with body 10, as will be apparent in the ensuing description.

The axial bore of body 10 has a first, forward portion 16 which tapers outwardly, symmetrically about axis X—X at a first angle, e.g., an included angle of 5°, and a second portion 18 which joins first portion 16 and tapers outwardly to rear end 14 of body 10 at a second angle, larger than the first angle. For example, the included angle of taper of second portion 18 may be about 12°. Annular collar 20, having external threads 21, extends from rear end 14 of body 10, encircling the open rear end of the axial bore.

Die member 22 has an exterior surface which tapers outwardly from front to rear at the same angle as first portion 16 of the bore of body 10. An internal cavity is formed in die member 22 by an internal surface tapering inwardly from rear to front and joining a cylindrical bore 23, forming orifice 24 at the front of die member 22. When die member 22 is assembled in body 10, as shown in FIG. 1, the tapered external surface of the die member mates with first portion 16 of the axial bore of body 10, and the front end of the die member is substantially flush with, or recessed slightly within, front end 12 of the body.

Die tip 26 has a through, axial bore of constant diameter, typically a few thousandths of an inch larger in diameter than filament 28, such as an electrical wire or optical fiber, which is drawn through the apparatus for coating. Cylindrical tip 30, having a diameter which is less than that of cylindrical bore 23 of die member 22 by the desired thickness of the coating to be applied to the filament, is positioned at the front end of die tip 26. The body of die tip 26 includes a front portion 32 which tapers outwardly from tip 30 to rear portion 34 which tapers inwardly from its junction with front portion 32 toward the rear end of die tip 26.

Tip holder or core tube 36 has a through axial bore with a first portion 38 which tapers inwardly from the front end toward the rear at the same angle as the taper of portion 34 of die tip 26, and a rear portion 40 of constant diameter, i.e., a cylindrical bore. The external surface of tip holder 36 tapers outwardly from the front end toward the rear for a first portion 42 of its axial length. First portion 42 adjoins a relatively short, cylindrical portion 44. Annular groove 46 extends about tip holder 36 between cylindrical portion 44 and a second portion 48 of the axial length of tip holder 36. The exterior surface of portion 48 tapers outwardly from front to rear at the same angle as portion 18 of the axial bore of body 10. Cylindrical portion 50, which is externally threaded for purposes described later, extends integrally from portion 48 rearwardly of body 10.

The elements are assembled with body 10 by first inserting die member 22, small end first, into the rear end of the axial bore of body 10, and moving die member 22 forwardly until the external surface of the die member mates with internal surface portion 16 of the bore. Die tip 26 is inserted into the forward end of the axial bore of tip holder 36 where tapered surface portion 34 mates with the like-tapered, forward, internal surface portion 38 of the tip holder. Tip 26 and holder 36 are then inserted into the rear end of the axial bore of body 10 and moved forwardly until second portion 48 of holder 36 mates with like-tapered surface portion 18 of the body bore, and cylindrical tip 30 extends into bore 23 of die member 22. Lock nut 52 is then threaded on collar 20 of body 10 and engages the surface of tip holder 36 in the area adjacent the rear end of portion 48.

Figure 2:
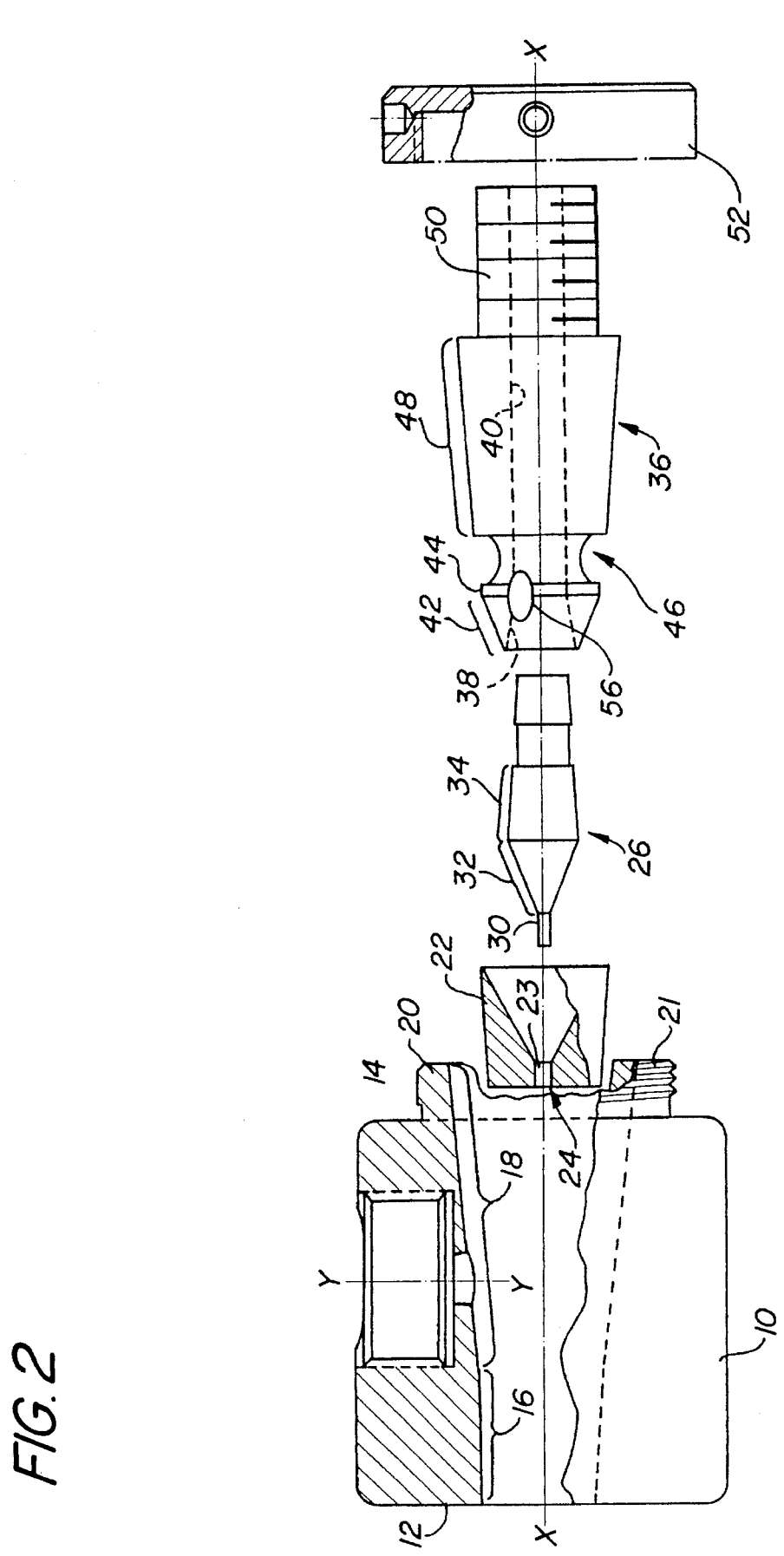
FIG. 2 is an exploded view, also in side elevation and partly in section, of the components of FIG. 1.
Figure 10:
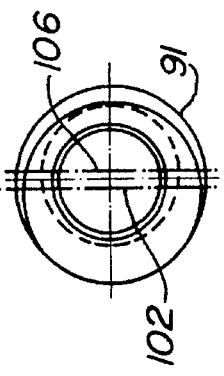
FIGS. 9 and 10 are fragmentary, side elevational and front elevational views, respectively, of the component of FIG. 8.

The elements are thus assembled in the positions shown in FIG. 1 and the apparatus is ready for operation. Electrical wire 28, or other such continuous, filamentary material to be coated, is inserted from the rear of the apparatus, through the axial bore of die tip 26, wherein it fits closely with, e.g., about 0.001" clearance, and out the forward end. Molten plastic, or other such coating material in a flowable state, is injected through the radial bore of body 10 and flows around radial groove 46 of core tube-tip holder 36. Cylindrical portion 44 fits rather closely within the adjacent portion of the axial bore of body 10, whereby the majority, or substantially all, of the material injected into groove 46 flows through a plurality of axial grooves. One such axial groove is seen in FIGS. 1 and 2, denoted by reference numeral 56, others being formed at equal intervals about tip holder 36.

As shown in FIG. 1, a cavity 54 is formed between first portion 42 of tip holder 36 and the axial bore of body 10, and between the surface of portion 32 of die tip 26 and the internal surface of die member 22. The coating material flows through this cavity and out of the front end of the apparatus through the annular clearance between bore 23 and cylindrical tip 30, thus being applied as a coating of uniform thickness to filament 28. The pressure exerted by the coating material as it flows through the apparatus tends to push both core tube-tip holder 36 and die tip 26 rearwardly, and to push die member 22 forwardly. This pressure maintains tip holder 36 in tight engagement with nut 52, portion 34 of die tip 26 with internal bore portion 38 of tip holder 36, and die member 22 with surface portion 16 of the axial bore of body 10.

The elements may be disassembled by disengaging nut 52 from collar 20 and removing tip holder 36, with die tip 26 therein, and die member 22 through the rear of the axial bore of body 10. In the event tip holder 36 tends to stick to the mating surface of the bore, release nut 60 is threaded on portion 50 of tip holder 36 after backing off nut 52 to some extent, as shown in FIG. 3. Exerting a torque on release nut 60 while the latter is in engagement with nut 52. Threads 21 on collar 20, and the threads on portion 50 are opposite-handed, whereby exerting a torque on nut 60 while it is engaged with nut 52 does not advance nut 52 on threads 21. Thus, tip holder 36 is pulled back against nut 52, free of its engagement with the bore of body 10. Both nuts 52 and 60 are then removed, and the elements may be easily disassembled. Nuts 52 and 60 may be of square, hexagonal, or other external configuration suitable for engagement by a socket or open-end wrench, or have recesses for engagement by a spanner wrench, as shown.

Turning now to FIGS. 4–6, an alternate form of the tip holder, denoted in this embodiment by reference numeral 62, is shown. Tip holder 62, as in the case of tip holder 36, has a through axial bore with a first portion 64 which tapers inwardly from the front end toward the rear to matingly engage a like-tapered external surface portion of a die tip, and a cylindrical rear portion 66. The external surface of tip holder 62 includes frustoconical forward and intermediate portions 68 and 70, respectively, separated by annular groove 71, and externally threaded, cylindrical, rear portion 72. Portion 70 matingly engages a like-tapered internal surface of an axial bore in the cross-head body, and portion 72 extends out of the rear end of the body axial bore for engagement by a lock nut, as in the previous embodiment.

Forward portion 68, which extends from a first diameter at the front end of the tip holder, to a larger, second diameter 73, and annular groove 71 differ significantly from the previous embodiment. Frustoconical surface portion 74 tapers outwardly from the front end of tip holder 62 concentrically about central axis Z—Z thereof. Frustoconical surface portion 76 tapers outwardly from front to rear concentrically about an axis which is at an angle to axis Z—Z. Moreover, surface portion 76 tapers to merge with second diameter 73 on one side of tip holder 62 (the top side as seen in FIG. 5), and the center 78 of the circle defined by second diameter 73 is offset from axis Z—Z, i.e., second diameter 73 is eccentric with respect to the central axis of tip holder 62.

Frustoconical surface portion 80 tapers inwardly toward the rear from a junction with second diameter 73 concentrically about an axis which is at an angle with respect to axis Z—Z. As best seen in FIG. 5, surface portions 76 and 80 essentially merge with one another and with surface portion 74 at one side of second diameter 73, tip holder 62 being rotated 90° (in a clockwise direction as viewed from the front) in FIG. 4 from the position of FIG. 5.

Annular groove 71 extends around the entire periphery of tip holder 62, concentrically about center-line 84 which is offset from axis Z—Z on the opposite side from centerline 78. That is, groove 71 is eccentric with respect to the central axis of the tip holder, and is diametrically opposite in eccentricity to second diameter 73. The shape of groove 71 is also different from that of groove 46 of the previous embodiment. Rather than being a continuous curve (e.g., semicircular or parabolic) in side view, groove 71 is essentially flat in its central portion and extends to join the forward end of portion 70 in an essentially frustoconical taper. The forward end of the central portion of groove 71, as seen in the position of FIG. 5, merges with surface portion 80 at the bottom. Groove 71 tapers outwardly concentrically about axis Z—Z from the forward end of the central portion to merge with portion 80 about the remainder of its periphery, thus also merging with surface portions 74 and 76 on one side (the top of FIG. 5) As indicated in FIG. 5, surface portions 76 and 80 are at angles of 15° and 10°, respectively, to a line parallel to axis Z—Z and tangent to second diameter 73, while the forward, tapering portion of groove 71 is at an angle of 45°.

Figure 7:
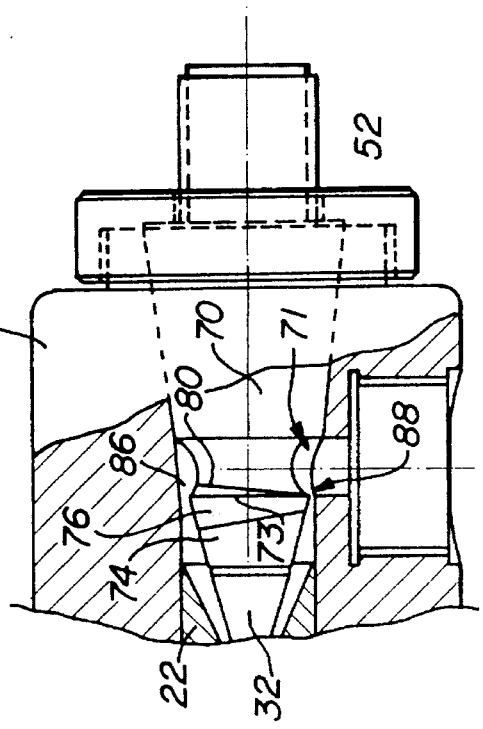
FIG. 7 is a fragmentary, side elevational view, partly in section, showing the component of FIGS. 4–6 in assembled relation with components of FIGS. 1–3.

Tip holder 62 is shown in FIG. 7 in assembled relation with other elements of the apparatus. Like reference numerals are used to denote elements which may be identical to those shown in FIGS. 1–3, which include body 10, die 22, tip 32 and lock nut 52. When surface portion 70 of tip holder 62 is in mating engagement with the axial bore of body 10, groove 71 is inwardly adjacent the radial bore of body 10. Thus, molten material injected through the body radial bore immediately flows around the periphery of the groove in the tip holder, as in the previous embodiment.

The rotational orientation of tip holder 62 relative to body 10 is such that the eccentricity of groove 71 places the side with the greatest clearance between the surface of the groove and the adjacent surface of the body axial bore inwardly adjacent the radial bore through which molten material enters. Stated another way, the deepest part of groove 71 is positioned adjacent the radial bore, and the shallowest part of the groove is diametrically opposite the radial bore. Since eccentricity at second diameter 73 is opposite that of groove 71, the largest clearance between second diameter 73 and the adjacent surface of the body axial bore will be opposite the body radial bore, in the region denoted by reference numeral 86. Likewise, the smallest clearance, in the region denoted by reference numeral 88, is adjacent the portion of groove 71 immediately inwardly of the body radial bore.

Figure 8:
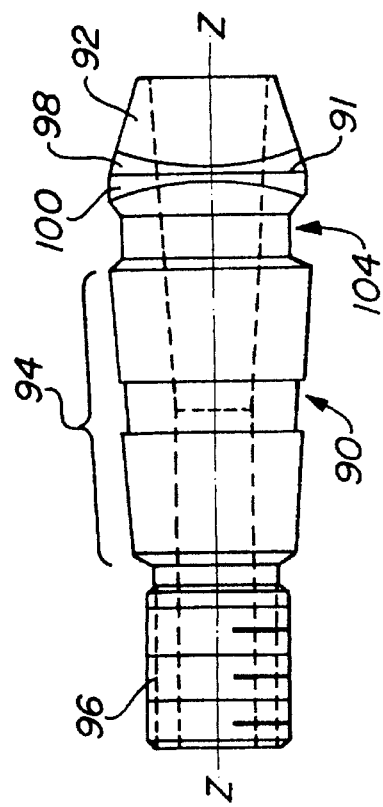
FIG. 8 is a side elevational view of a further embodiment of the component of FIGS. 4–6.

The plastic or other molten coating material, as in the usual cross-head die operation, is injected into the die body at high pressure. It has been found that providing the tip holder with an annular groove immediately inwardly adjacent the radial bore in the body, and distributing the material around the groove and thence forwardly over the front parts of the tip holder and the tip results in excellent uniformity of the coating as it exits the die. Although the axial grooves of the tip holder of FIGS. 1–3 provide satisfactory communication of the annular groove with the cavity surrounding the front parts of the tip holder and tip, the eccentric tip holder of FIGS. 4–7 is greatly superior. In the illustrated embodiment, clearance in areas 86 and 88 is about 0.040" and 0.020", respectively Another embodiment of eccentric tip holder, denoted generally by reference numeral 90, is shown in FIGS. 8 . 10. Tip holder 90 includes the same axial bore for positioning the tip concentrically within the die body axial bore, as well as forward external surface portion 92, intermediate portion 94, and externally threaded rear portion 96. Intermediate portion 94 tapers inwardly from front to rear, rather than the reverse, as in tip holders 36 and 62 of the previous embodiments. Thus, tip holder 90 is suitable for use in an assembly such as that of applicant's earlier referenced U.S. Pat. No. 5,031,568, wherein all elements other than the tip holder may be identical.

Figure 9:
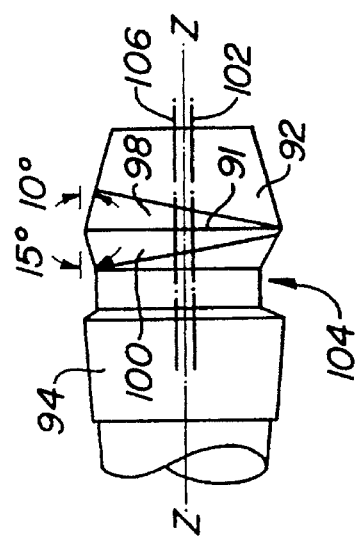

As in tip holder 62 of FIGS. 4–7, external surface portion 92 tapers outwardly from a first diameter at the front end of tip holder 90 to second diameter 91. Surface portions 98 and 100 taper outwardly and inwardly, respectively, from front to rear, each being concentric about axes at angles to axis Z—Z. Centerline 102 of second diameter 91 is laterally offset from and thus eccentric with respect to, central axis Z—Z of tip holder 90. Annular groove 104 is also eccentric with respect to axis Z—Z, being concentric about centerline 106, and of essentially the same configuration as groove 71. The angles of tapered surface portions 98 and 100 are reversed from those of the FIGS. 4–7 embodiment; that is, portion 98 tapers inwardly from second diameter 91 toward the front at an angle of 10° with respect to a line parallel to axis Z—Z, while portion 100 tapers inwardly from second diameter 91 toward the rear angle of 15° with respect to the same line, as indicated in FIG. 9.

What is claimed is:

1. A method of releasing an internal element of a crosshead die assembly from mating engagement of a frustoconical, external surface of said element with an essentially identical, frustoconical, internal surface of an axial bore extending into the rear end of the body of said assembly, said frustoconical surfaces tapering inwardly from the rear toward the front end of said body, said method comprising:
    a) providing a threaded portion on said element extending outwardly from said body rear end;
    b) providing an abutment surface, fixed with respect to said body, laterally adjacent said threaded portion;
    c) advancing a release nut on said threaded portion into abutting relation with said abutment surface; and
    d) applying a torque to said release nut tending to advance it in the direction of said abutment surface sufficient to exert an axial force on said element in a rearward direction relative to said body to release the mating engagement of said frustoconical surfaces.

2. The method of claim 1 and including the further steps of providing a threaded collar on said body surrounding said bore at said body rear end, threading a lock nut on said collar into abutting relation with a rearwardly facing surface of said element to maintain said element in assembled relation with said body with said frustoconical surfaces in mating engagement, and withdrawing said lock nut out of abutting relation with said rearwardly facing surface of said element prior to applying said torque to said release nut.

3. The method of claim 2 wherein said abutment surface is on said lock nut.

4. The method of claim 3 wherein the threads of said collar and lock nut are opposite-handed from the threads of said threaded portion and release nut, whereby said step of applying torque to said release nut does not tend to advance said lock nut back into abutting relation with said rearwardly facing surface of said element.

* * * * *